(12) United States Patent
Mohtadi et al.

(10) Patent No.: US 9,252,458 B2
(45) Date of Patent: *Feb. 2, 2016

(54) CARBORANYL MAGNESIUM ELECTROLYTE FOR MAGNESIUM BATTERY

(71) Applicant: Toyota Motor Engineering & Manufacturing North America, Inc., Erlanger, KY (US)

(72) Inventors: Rana Mohtadi, Northville, MI (US); Oscar Tutusaus, Ann Arbor, MI (US); Timothy S. Arthur, Ann Arbor, MI (US); Tyler J. Carter, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/272,318

(22) Filed: May 7, 2014

(65) Prior Publication Data

US 2014/0349178 A1 Nov. 27, 2014

Related U.S. Application Data

(63) Continuation-in-part of application No. 13/902,797, filed on May 25, 2013.

(51) Int. Cl.
| | |
|---|---|
| *H01M 10/0569* | (2010.01) |
| *H01M 10/058* | (2010.01) |
| *H01M 10/54* | (2006.01) |
| *H01M 10/0568* | (2010.01) |
| *H01M 10/054* | (2010.01) |

(52) U.S. Cl.
CPC ........ *H01M 10/0568* (2013.01); *H01M 10/054* (2013.01); *H01M 10/058* (2013.01); *H01M 2300/0025* (2013.01); *Y10T 29/49108* (2015.01)

(58) Field of Classification Search
CPC .... H01M 2300/00–2300/0082; H01M 10/054; H01M 10/0569
See application file for complete search history.

(56) References Cited

U.S. PATENT DOCUMENTS 3,458,580 A 7/1969 Grafstein et al.

OTHER PUBLICATIONS

Shelly et al, ".eta.1-Benzene Coordination: The Synthesis and X-ray Crystal Structure of a Novel Silver Salt of the Weakly Coordinating Carborane Anion B11CH12-", J. Am. Chem. Soc. 1985, 107, pp. 5955-5959.
Muldoon et al, "Electrolyte roadblocks to a magnesium rechargeable battery", Energy Environ. Sci., 2012, 5, pp. 5941-5950.
Korbe et al, "Chemistry of the Carba-closo-dodecaborate(-) Anion, CB11H12-", Chem. Rev. 2006, 106, 5208-5249.
Plesek et al, "Potential Applications of the Boron Cluster Compounds", Chem. Rev. 1992. 92. pp. 269-278.
Guo et al, "Boron-based electrolyte solutions with wide electrochemical windows for rechargeable magnesium batteries", Energy Environ. Sci., 2012, 5, pp. 9100-9106.
Aurbach et al, "Prototype systems for rechargeable magnesium batteries", Nature, vol. 407, Oct. 12, 2000 in 5 pages.
Amir et al, "Progress in nonaqueous magnesium electrochemistry", Journal of Power Sources 174 (2007) pp. 1234-1240.

*Primary Examiner* — Ula C Ruddock
*Assistant Examiner* — Thomas Parsons
(74) *Attorney, Agent, or Firm* — Christopher G. Darrow; Darrow Mustafa PC

(57) ABSTRACT

An electrochemical device is provided having a carboranyl magnesium electrolyte. Specifically the disclosure relates to an electrochemical device having a magnesium anode, a cathode, and a current collector made of non-noble metal, and a carboranyl magnesium electrolyte. In contact with the electrolyte, the non-noble metal cathode current collector has unusually high oxidative stability>3.0V vs. a magnesium reference. Processes for making the electrochemical device are additionally provided.

16 Claims, 5 Drawing Sheets

CARBORANYL MAGNESIUM ELECTROLYTE FOR MAGNESIUM BATTERY

CROSS-REFERENCE TO RELATED APPLICATIONS

This application is a continuation-in-part of U.S. patent application Ser. No. 13/902,797 filed May 25, 2013, and which is herein incorporated by reference in its entirety.

BACKGROUND

The present invention is, in general, directed to an electrochemical device, and to a process for making an electrochemical device having a carboranyl magnesium electrolyte, and in particular to an electrochemical device having a carboranyl magnesium electrolyte which is compatible with a magnesium anode and a cathode made of a non-noble metal while maintaining an oxidative stability>3.0V vs. a magnesium reference.

Due to the formation of an ion blocking layer at the electrode surface, most common salts of magnesium (Mg) cannot be used as effective magnesium battery electrolytes. It has been shown previously that Grignard reagents (R—Mg—X) support magnesium deposition and stripping. Currently, typical electrolytes are based on a group of compounds known as organohaloaluminates which are obtained by the reaction of an alkyl Grignard or aryl Grignard with an aluminum based Lewis Acid ($AlX_3$). Other non-haloaluminate electrolytes compatible with Mg metal with high reported stability are based on tris(3,5-dimethylphenyl)borane and phenyl Grignard.

The above compounds have been shown to effectively mediate reversible magnesium deposition and stripping with enhanced current density as compared to previously assessed electrolytes, but are incompatible with non-noble metal electrodes such as stainless steel, copper, and aluminum. For example, these compounds have been shown to be stable to >3.0 V (vs. magnesium reference) at a platinum surface but were found to have a much lower stability on stainless steel, i.e. <2.5 V (vs. magnesium reference) and <2.0V on aluminum (vs. magnesium reference), due to their incompatibility with these metal surfaces at potentials >2.5 V (vs. magnesium reference). This prevents the use of non-noble metals as current collectors in contact with the high voltage cathodes thereby limiting the energy density of a theoretical magnesium battery. Additionally, a theoretical magnesium battery in which a noble metal is used as current collectors would incur very high costs.

Accordingly, there exists a need for an improved electrolyte which would be compatible with non-noble metal electrodes.

SUMMARY

Disclosed, in various non-limiting embodiments, are electrochemical devices having a carboranyl magnesium electrolyte and a process of forming these electrochemical devices.

In one embodiment, provided herein is an electrochemical device which includes an anode comprising magnesium, a cathode such as Chevrel phase $Mo_6S_8$, and a carboranyl magnesium electrolyte. The carboranyl magnesium electrolyte comprises a composition having a formula of:

$Mg(C_iB_jH_{j+1})X$,  formula (I)

$Mg(C_iB_jH_{j+1})Y$,  formula (II)

$Mg(C_iB_jH_{j+1})_2$,  formula (III)

$Mg_2(C_2B_jH_j)X_2$, or  formula (IV)

a combination of at least two of the foregoing, wherein i is 1 or 2; j is an integer between 8 and 11 inclusive; X is a halide such as chloride (Cl—), bromide (Br—), or iodide (I—); and wherein Y is a non-halide monoanion (i.e. an anion having a −1 charge such as $[BH4]^-$).

In yet another embodiment, provided herein is a process for preparing an electrochemical device. The process includes a step of connecting an anode composed of magnesium or a magnesium alloy and a cathode via an external electrically conductive structure and a step of contacting the anode and cathode with a carboranyl magnesium electrolyte. The carboranyl magnesium electrolyte comprises a composition having a formula of:

$Mg(C_iB_jH_{j+1})X$,  formula (I)

$Mg(C_iB_jH_{j+1})Y$,  formula (II)

$Mg(C_iB_jH_{j+1})_2$,  formula (III)

$Mg_2(C_2B_jH_j)X_2$, or  formula (IV)

a combination of at least two of the foregoing, wherein i is 1 or 2; j is an integer between 8 and 11 inclusive; X is a halide such as chloride (Cl—), bromide (Br—), or iodide (I—); and wherein Y is a non-halide monoanion (i.e. an anion having a −1 charge such as $[BH4]^-$).

These and other features of the electrochemical device having a carboranyl magnesium electrolyte, and the process for making the same, will become apparent from the following detailed description when read in conjunction with the figures and examples, which are exemplary, not limiting. The carboranyl magnesium electrolyte as described can be employed alone or in combination with other electrolyte materials.

BRIEF DESCRIPTION OF THE DRAWINGS

For a better understanding of the processes and devices having a carboranyl magnesium electrolyte, with regard to the embodiments thereof, reference is made to the accompanying examples and figures, in which.

DETAILED DESCRIPTION

Figure 1:
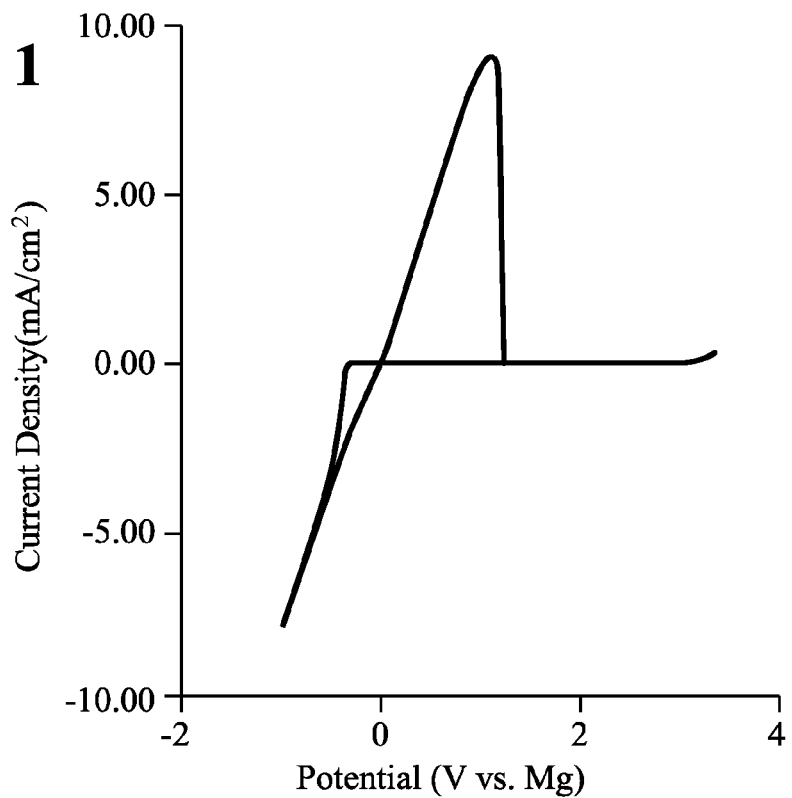
FIG. 1 is a cyclic voltammogram of a platinum (Pt) working electrode in contact with 0.2 M 1-(1,7-carboranyl)magnesium chloride in tetrahydrofuran (THF) at a scan rate of 5 mV/s.

Provided herein are exemplary embodiments of an electrochemical device having a carboranyl magnesium electrolyte and of a process for making an electrochemical device. The electrochemical device having a carboranyl magnesium electrolyte provided can be beneficial for use in magnesium batteries with electrodes made of non-noble metals such as stainless steel. The electrochemical device can be, for example, a battery cell, which generally comprises an anode current collector and a cathode current collector, which are externally connectable to a load or to a recharging source as appropriate. It should be noted that the terms "anode" and "cathode" are used in the present specification as those terms are understood in the context of batteries placed across a load, i.e. the term "anode" denotes the negative pole and the term "cathode" the positive pole of the battery. In addition, anode or "negative electrode" refers to an electrode where electrochemical oxidation occurs during the discharging process. Likewise, cathode, or "positive electrode" refers to an electrode where electrochemical reduction occurs during the discharging process. In an embodiment, the anode, cathode, or both is/are made substantially or entirely of non-noble metals, such as stainless steel, aluminum, magnesium, copper, or an alloy including at least one of the foregoing. In certain examples, "metal" refers to both metals and metalloids. Other examples for cathode include oxides, sulfides and sulfur.

Magnesium electrolytes based on halide free anions such as magnesium borohydride and derivatives thereof, such as boron clusters, were reported by Mohtadi et al. U.S. Provisional Application Ser. No. 61/678,672 which is hereby incorporated by reference in its entirety. Magnesium borohydride electrolytes were reported as corrosion-free electrolytes, due to the absence of halides in the anion structure. As an addition to U.S. Provisional Ser. No. 61/678,672, provided herein are electrolytes based on carboranyl anions. Like anionic boron clusters such as $(B_{12}H_{12})^{2-}$, anionic carboranyl structures such as $(B_{11}H_{12})^-$ and $(C_2B_{10}H_{11})^-$ share the desired absence of halides, but have higher solubility in ethereal solvents. The application of organomagnesium compounds of carboranes has been previously limited to their use as intermediates in chemical synthesis.

Disclosed herein, are the electrochemical properties discovered for these materials and their use as electrolytes for rechargeable magnesium batteries. Examples can be compounds such as $MgC_2B_{10}H_{11}X$ and $MgCB_{11}H_{12}X$, where X is a halide such as $Cl^-$ and $Br^-$, and halide free compounds such as $Mg(C_2B_{10}H_{11})_2$, $Mg(CB_{11}H_{12})_2$, $Mg(C_2B_{10}H_{11})$—, and $Mg(CB_{11}H_{12})(BH_4)$. Additional examples can include compounds such as $Mg_2(C_2B_{10}H_{10})X_2$, where X is a halogen anion such as $Cl^-$.

These carboranyl magnesium compounds are compatible with Mg metal and can exhibit high oxidative stability on both noble and non-noble metal electrodes. For example, $MgC_2B_{10}H_{11}Cl$ shows oxidative stability on stainless steel metal (e.g., 3.2 V vs. Mg reference), which to date, is higher than any other electrolyte compatible with Mg metal. Therefore by using the carboranyl magnesium compounds described herein, corrosion issues can be mitigated and electrochemical devices, such as Mg batteries, can be constructed at lower cost with more earth abundant metals, (e.g., aluminum, stainless steel). Moreover, the high solubility of these compounds in ethereal solvents allow high current density with Coulombic efficiencies of about 96%.

Accordingly, provided herein is an electrochemical device that includes a magnesium anode; a cathode; and a carboranyl magnesium electrolyte. In general, the carboranyl electrolyte will contain at least one magnesium cation ($Mg^{2+}$) and at least one carboranyl anion per stoichiometric unit. In some instances, the carboranyl electrolyte will comprise a composition having a formula of:

  $Mg(C_iB_jH_{j+1})X$,  formula (I)

  $Mg(C_iB_jH_{j+1})Y$,  formula (II)

  $Mg(C_iB_jH_{j+1})_2$,  formula (III)

  $Mg_2(C_2B_jH_j)X_2$, or  formula (IV)

a combination of at least two of the foregoing, wherein i is 1 or 2; j is an integer between 8 and 15 inclusive; X is a halide such as chloride ($Cl^-$), bromide ($Br^-$), or iodide ($I^-$); and wherein Y is a non-halide monoanion (i.e. an anion having a −1 charge). In many variations, the cathode will comprise an active material which is a non-noble metal.

In many instances, the carboranyl anion, represented above as $C_iB_jH_j$, or $C_iB_jH_{j+1}$ will be an anion of an icosahedral-closo-carborane, wherein (i+j) equals 12. In such instances, i will be 1 or 2 and j will correspondingly be 11 or 10.

It is to be appreciated here and throughout the present disclosure that when a compound includes multiple halide species represented, for example, as $X_2$, the multiple halides need not necessarily be of the same identity but could include, for example, a non-identical pair such as ClBr. Non-limiting examples of suitable monoanions include alkoxides. In an embodiment, Y in formula II may be borohydride ($BH_4^-$). In some instances, the carboranyl anion contained in the carboranyl magnesium electrolyte can be any or a combination of $(CB_{11}H_{12})^-$, any isomer of $(C_2B_{10}H_{11})^-$, and any isomer of $(C_2B_{10}H_{10})^{2-}$. Additionally, the carboranyl magnesium electrolyte as described can be employed alone or in combination with other electrolyte materials.

The carboranyl magnesium compounds used in the electrochemical device having a carboranyl magnesium electrolyte described herein are materials that are either soluble or partially soluble in ethereal solvents under normal operating conditions for the associated electrochemical cell. Suitable ethereal solvents can include THF, ethylene glycol dimethyl ether (glyme), bis(2-methoxyethyl) ether (diglyme), tetraethylene glycol dimethyl ether (tetraglyme), or any other ethereal solvent capable of solubilizing the carboranyl magnesium electrolyte employed and suitable to the configuration and requirements of the electrochemical cell. In certain embodiments, it is contemplated that the carboranyl magnesium electrolyte will have solubility in tetrahydrofuran (THF) of at least 0.05 M at 25° C. and atmospheric pressure.

The carboranyl magnesium compounds used as electrolytes in the electrochemical devices and processes provided herein can be obtained by the reaction of a non-ionic carborane, alternatively referred to herein as a "precursor carborane", such as m-carborane ($1,7-C_2B_{10}H_{12}$), p-carborane ($1,12-C_2B_{10}H_{12}$), or o-carborane ($1,2-C_2B_{10}H_{12}$), with a Grignard reagent R—Mg—X or a dialkyl magnesium compound R—Mg—R', where R and R' are each an alkyl moiety, an aryl moiety or a combination thereof, of the same or different identity, and X is as described above. The Grignard reagent or dialkylmagnesium compound can be added to the carborane at a molar ratio of 1:1 to 2:1 to produce carboranyl magnesium such as exemplified by formula I. The reaction can be visualized with reference to example Reaction A:

$$C_2B_{10}H_{12}+RMgCl \rightarrow Mg(C_2B_{10}H_{11})Cl+RH \qquad A.$$

The carboranyl magnesium compounds used as electrolytes in the electrochemical devices and processes provided herein can also be obtained by reacting the precursor carborane with n-butyl lithium to produce a carboranyl lithium salt. A carboranyl lithium salt so produced can have a formula such as $LiC_iB_jH_{j+1}$ or $Li_2C_2B_jH_j$, n-butyl lithium can be added to the carborane, in a molar ratio of 1:1 to 2:1 to produce carboranyl lithium. Subsequent treatment of the carboranyl lithium with magnesium halide salt ($MgX_2$) typically in equimolar quantity to the carboranyl lithium produces the carboranyl magnesium electrolyte. For example, dissolving 0.5 g of m-caborane in 20 ml of THF followed by the slow addition of 4.5 ml 1.6 M n-butyl lithium in hexane in a drop wise manner at −78° C. followed by the addition of a slurry containing 0.6 g $MgCl_2$ in THF and refluxing for at least 24 hours provided a compound with formula 1,7-(1,7-$C_2B_{10}H_{10}$)—$Mg_2$—$Cl_2$, also describable as $Mg_2(C_2B_{10}H_{10})Cl_2$. The procedure can be visualized with reference to Reactions B1 and B2:

$$C_2B_{10}H_{12}+2n\text{-BuLi} \rightarrow Li_2(C_2B_{10}H_{10})+2n\text{-BuH} \qquad B1,$$

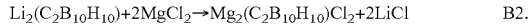

$$Li_2(C_2B_{10}H_{10})+2MgCl_2 \rightarrow Mg_2(C_2B_{10}H_{10})Cl_2+2LiCl \qquad B2.$$

In addition, the carboranyl magnesium compounds used as electrolytes in the electrochemical devices and processes provided herein can be obtained, for example, through a process similar to that described above and illustrated in Reactions B1-B2, but by replacing magnesium halide, $MgX_2$ with the non-halide magnesium salt, $MgY_2$, where Y is as defined above. For example, dissolution of 0.5 g of m-carborane in 20 ml of THF followed by the slow addition of 4.5 ml n-butyl lithium (present as 1.6 M in hexane) solution in a drop wise manner at −78° C. followed by the addition of 0.4 g $Mg(BH_4)_2$ in THF and refluxing for at least 24 hours provide a compound with formula 1-(1,7-$C_2B_{10}H_{11}$)$Mg(BH_4)$, also describable as $Mg(C_2B_{10}H_{11})(BH_4)$. In certain cases, particularly where the anion Y of the precursor magnesium salt $MY_2$ is substantially nucleophilic such as in $Mg(BH_4)_2$, $MgY_2$ can be reacted directly with a precursor carborane to produce the carboranyl magnesium electrolyte. These syntheses can be visualized with reference to example Reactions C1 and C2:

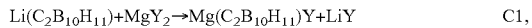

$$Li(C_2B_{10}H_{11})+MgY_2 \rightarrow Mg(C_2B_{10}H_{11})Y+LiY \qquad C1,$$

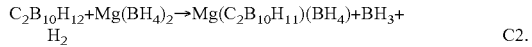

$$C_2B_{10}H_{12}+Mg(BH_4)_2 \rightarrow Mg(C_2B_{10}H_{11})(BH_4)+BH_3+H_2 \qquad C2.$$

In some variations, carboranyl magnesium compounds can be obtained by a salt metathesis reaction between a carboranyl silver precursor and a magnesium halide. For example, a solution of magnesium halide, such as magnesium bromide can be added to a solution of carboranyl silver, such as $AgCB_{11}H_{12}$. Carboranyl silver precursor can be prepared fully solvent dry according to published methods. Typically both the magnesium halide and carboranyl silver reactants would be present in an ethereal solvent such as THF. The solid product resulting from reaction of the magnesium halide and the carboranyl silver, composed of the carboranyl magnesium salt and silver halide, can be collected by filtration and the carboranyl magnesium compound can be purified by extraction with an alkylated glycol, such as tetraglyme. The general reaction proceeds according to Reaction D1, with reference to formula III:

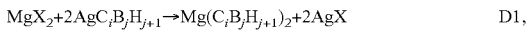

$$MgX_2+2AgC_iB_jH_{j+1} \rightarrow Mg(C_iB_jH_{j+1})_2+2AgX \qquad D1,$$

where X is a halide and i and j are as defined above. In further variations of electrolyte preparation according to Reaction D1, the magnesium halide of Reaction D1 can be replaced with a mixed magnesium salt, MgXY, where Y is a non-halide monoanion such as, for example, borohydride. Such further variations proceed according to Reaction D2:

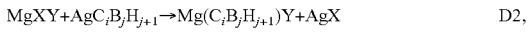

$$MgXY+AgC_iB_jH_{j+1} \rightarrow Mg(C_iB_jH_{j+1})Y+AgX \qquad D2,$$

enabling production of carboranyl magnesium electrolytes according to formula II.

It should be appreciated that, while some of the examples and reactions given above of procedures for producing carboranyl magnesium electrolytes referenced m-carborane or more generally $C_2B_{10}H_{12}$ as a particular precursor carborane, any precursor carborane or carboranyl salt, such as $CsCB_{11}H_{12}$ could be used.

Figure 2:
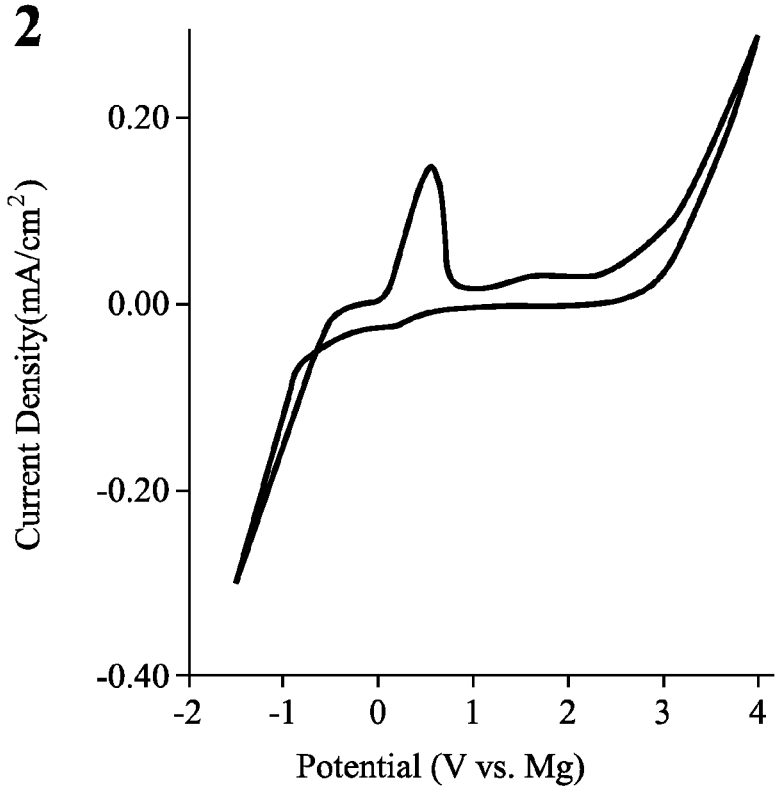
FIG. 2 is a cyclic voltammogram of a Pt working electrode in contact with 0.05 M 1,7-(1,7-carboranyl)-bis-magnesium chloride in THF at a scan rate of 5 mV/s.
Figure 3:
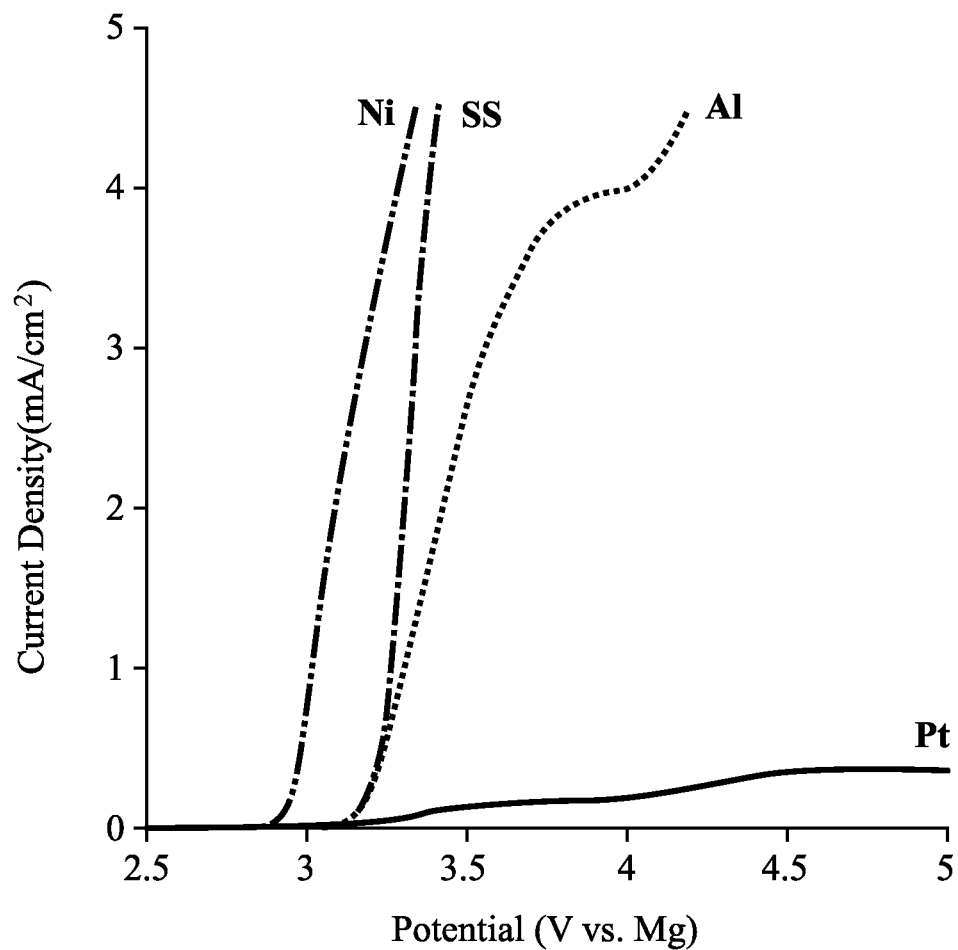
FIG. 3 is a set of linear scan voltammograms of various working electrodes, each in contact with 0.2 M 1-(1,7-carboranyl)magnesium chloride in THF, at a scan rate of 5 mV/s.

The carboranyl magnesium compounds used as electrolytes in the electrochemical devices and processes provided herein, when operated electrochemically, exhibit high oxidative stability of over 3.0 V (vs. Mg reference). In an embodiment, 1-(1,7-$C_2B_{10}H_{11}$)MgCl, and/or 1,7-(1,7-carboranyl)-bis-magnesium chloride (see e.g., FIGS. 1 and 2) can be compatible with Mg metal with Coulombic efficiency≥96% ("Coulombic efficiency", or "QE" or "ampere-hour efficiency" refer to the ratio, usually expressed as a percentage, of the ampere-hours removed from a battery during a discharge to the ampere-hours required to restore the initial capacity). Moreover, the carboranyl magnesium compounds used as electrolytes in the electrochemical devices and processes provided herein, have a high oxidative stability on non-noble metal operating electrodes, for example, stainless steel and aluminum. In an embodiment, 1-(1,7-$C_2B_{10}H_{11}$)MgCl, can exhibit high oxidative stability of over 3.0V vs. a Mg reference when used with stainless steel electrode(s) (see e.g., FIG. 3).

Figure 4A:
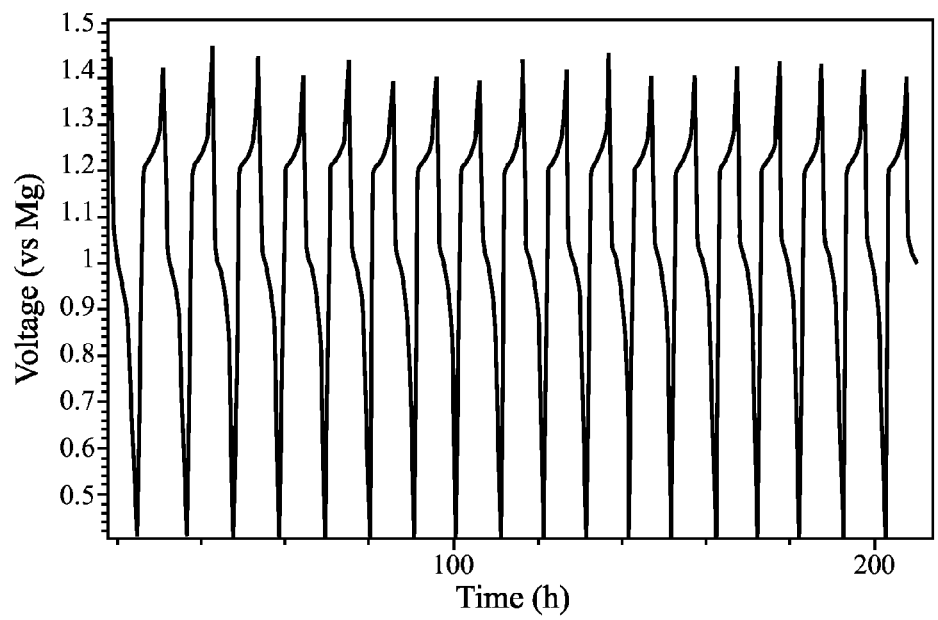
FIG. 4A is a plot of voltage vs. time over multiple charge/discharge cycles for an electrochemical cell having a molybdenum sulfide ($Mo_6S_8$) electrode opposite a magnesium metal electrode with 0.2 M 1-(1,7-carboranyl)magnesium chloride electrolyte.
Figure 4B:
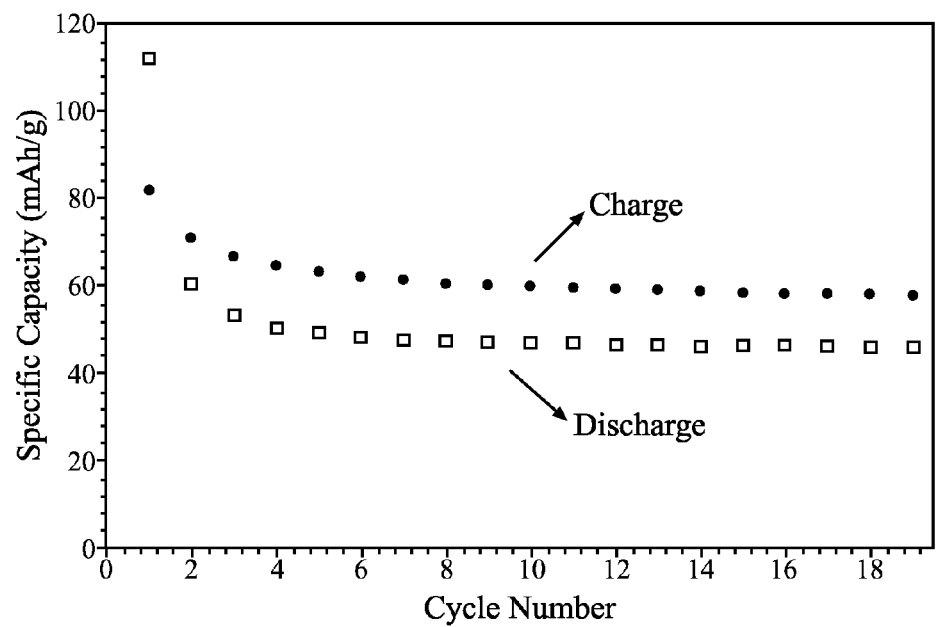
FIG. 4B is a plot of specific capacity vs. cycle number for the electrochemical cell of FIG. 4A.

As additionally illustrated in FIGS. 4A and 4B, showing the electrochemical behavior of a cell having 1-(1,7-$C_2B_{10}H_{11}$)MgCl electrolyte and molybdenum sulfide ($Mo_6S_8$) cathode, electrochemical devices of the present disclosure are highly consistent over multiple reversible charge/discharge cycles.

Figure 5A:
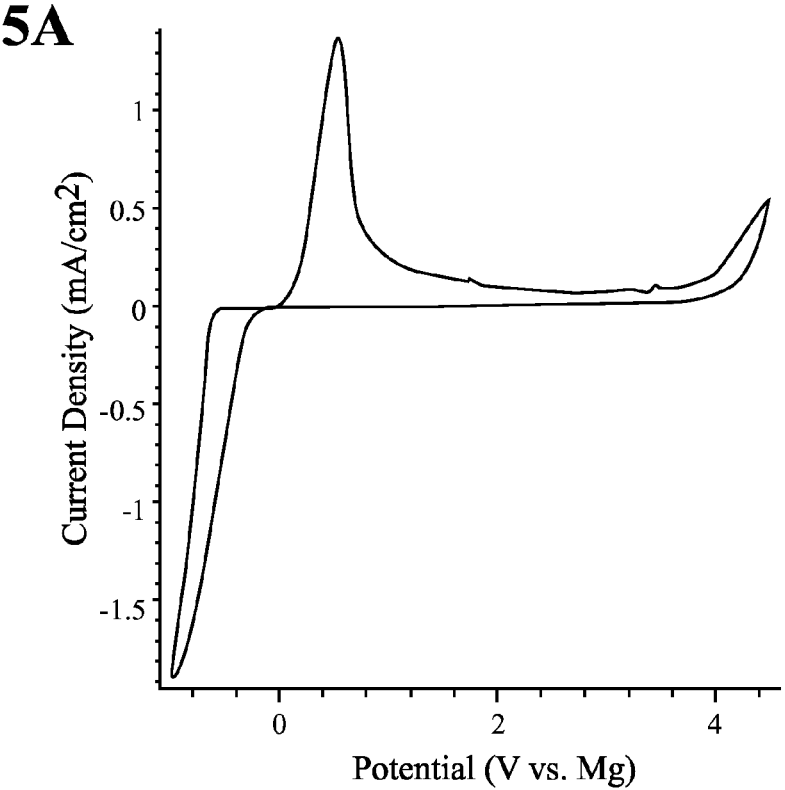
FIG. 5A is a cyclic voltammogram of a Pt working electrode in contact with 0.1 M solvent anhydrous magnesium bis(1-carba-closo-dodecaborate) in tetraglyme at a scan rate of 5 mV/s.
Figure 5B:
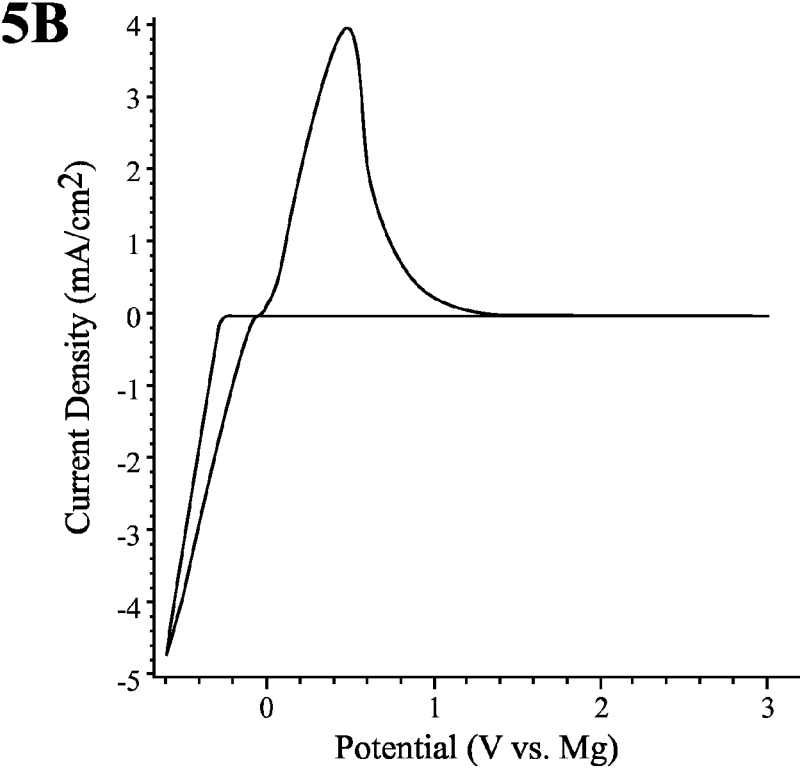
FIG. 5B is a cyclic voltammogram of a Pt working electrode in contact with 0.75 M solvent magnesium bis(1-carba-closo-dodecaborate) in tetraglyme at a scan rate of 5 mV/s.
Figure 5C:
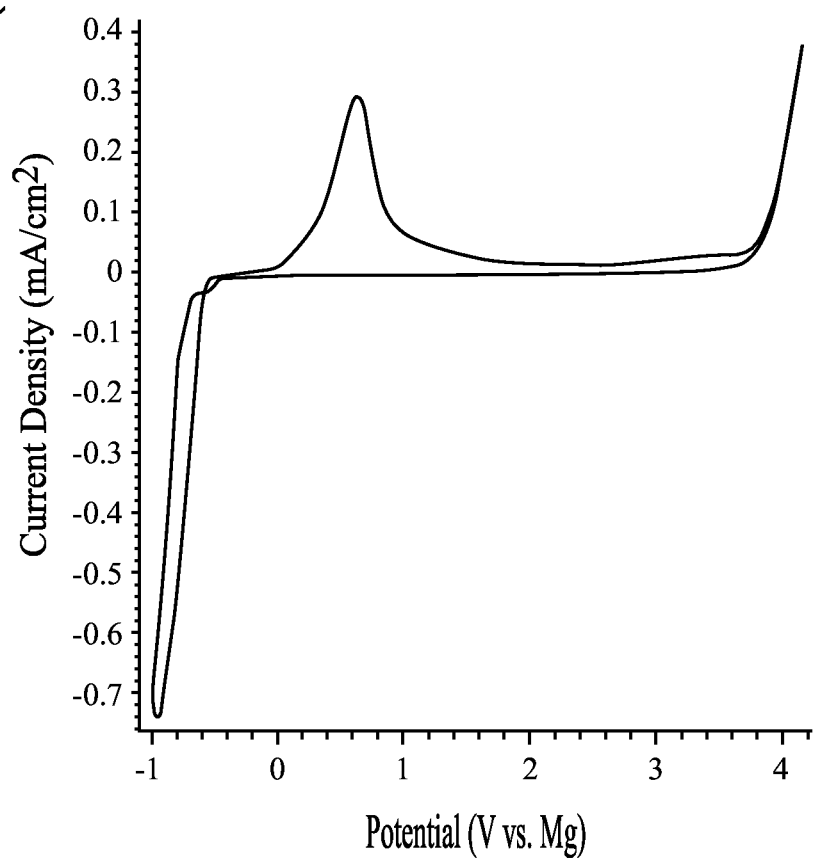
FIG. 5C is a cyclic voltammogram of a 316 stainless steel working electrode in contact with 0.1 M solvent magnesium bis(1-carba-closo-dodecaborate) in tetraglyme at a scan rate of 5 mV/s.

As noted, certain variations of the electrochemical devices and process disclosed employ carboranyl magnesium compounds prepared according to ion metathesis reactions with carboranyl silver exemplified by Reactions D1 and D2. FIGS. 5A and 5B, show cyclic voltammetry studies of $Mg(CB_{11}H_{12})_2$ electrolyte prepared by this method, and deployed in tetraglyme solution at 0.1 M and 0.75 M respectively, in a cell with platinum cathode. FIG. 5C shows an analogous cyclic voltammogram of 0.1 M $Mg(CB_{11}H_{12})_2$ in a cell with a 316 stainless steel cathode.

The 0.75 M and 0.1 M electrolyte on platinum cells achieve current densities of at least 4 mA·cm$^{-2}$ and 1.35 mA·cm$^{-2}$, respectively. Both cells then remain stable to about 4.0 V, above which current density starts to rise. Similarly, the cell having 0.1 M electrolyte on stainless steel exhibits similar cathode stability, remaining stable to about 3.8 V, beyond which current density starts to spike indicating the onset of cathode oxidation.

In a specific embodiment the electrochemical device includes an anode comprising magnesium; a cathode; and a carboranyl magnesium electrolyte comprising a composition having a formula of:

$$Mg(C_iB_jH_{j+1})X, \quad \text{formula (I)}$$

$$Mg(C_iB_jH_{j+1})Y, \quad \text{formula (II)}$$

$$Mg(C_iB_jH_{j+1})_2, \quad \text{formula (III)}$$

$$Mg_2(C_2B_jH_j)X_2, \text{ or} \quad \text{formula (IV)}$$

a combination of at least two of the foregoing, wherein i is 1 or 2; j is an integer between 8 and 11 inclusive; X is a halide; and wherein Y is a non-halide monoanion (i.e. an anion having a −1 charge), wherein (i) either of $C_iB_jH_{j+1}$ and $C_2B_jH_j$, representing a carboranyl anion of the carboranyl magnesium electrolyte, is an icosahedral-closo-carboranyl anion in which (i+j) equals 12, wherein (ii), X is Cl⁻, Br⁻, or I⁻, wherein (iii) Y is $(BH_4)^-$, wherein (iv) the carboranyl magnesium electrolyte is obtained by contacting a carborane with a Grignard reagent or dialkylmagnesium compound R—Mg—R', where R and R' are each an alkyl moiety, an aryl moiety or a combination thereof, wherein (v) the carboranyl magnesium is obtained by contacting a carboranyl lithium, represented by the formula $LiC_iB_jH_{j+1}$ or $Li_2C_2B_jH_j$, with a magnesium salt, wherein (vi) the carboranyl magnesium electrolyte is obtained by contacting a carboranyl silver, represented by the formula $AgC_iB_jH_{j+1}$, with a magnesium salt, or wherein (vii) the electrolyte is stable at an electrical potential greater than 3.0 V.

Also provided herein is a process for preparing an electrochemical device. The process includes a step of connecting an anode composed of magnesium or a magnesium alloy, and a cathode with working voltage of at least 1.5 V relative to a magnesium reference via an external electrically conductive structure. The process includes an additional step of contacting the anode and cathode with a carboranyl magnesium electrolyte comprising a composition having a formula of:

$$Mg(C_iB_jH_{j+1})X, \quad \text{formula (I)}$$

$$Mg(C_iB_jH_{j+1})Y, \quad \text{formula (II)}$$

$$Mg(C_iB_jH_{j+1})_2, \quad \text{formula (III)}$$

$$Mg_2(C_2B_jH_j)X_2, \text{ or} \quad \text{formula (IV)}$$

a combination of at least two of the foregoing, wherein i is 1 or 2; j is an integer between 8 and 11 inclusive; X is a halide; and wherein Y is a non-halide monoanion (i.e. an anion having a −1 charge). In many variations the cathode will comprise an active material which is a non-noble metal.

In a specific embodiment, the process can further comprise a carboranyl electrolyte wherein, (i) either of $C_iB_jH_{j+1}$ and $C_2B_jH_j$, representing a carboranyl anion of the carboranyl magnesium electrolyte, is an icosahedral-closo-carboranyl anion in which (i+j) equals 12, wherein (ii), wherein X is Cl⁻, Br⁻, or I⁻, wherein (iii) Y is $(BH_4)^-$, wherein (iv) the carboranyl magnesium electrolyte is obtained by contacting a carborane with a Grignard reagent or dialkylmagnesium compound R—Mg—R', where R and R' are each an alkyl moiety, an aryl moiety or a combination thereof, wherein (v) the carboranyl lithium is obtained by contacting a carboranyl lithium, represented by the formula $LiC_iB_jH_{j+1}$ or $Li_2C_2B_jH_j$, with a magnesium salt, wherein (vi) the carboranyl magnesium electrolyte is obtained by contacting a carboranyl silver, represented by the formula $AgC_iB_jH_{j+}$, with a magnesium salt, or wherein (vii) the electrolyte is stable at an electrical potential greater than 3.0 V.

All ranges disclosed herein are inclusive of the endpoints, and the endpoints may be independently combined with each other. "Combination" is inclusive of blends, mixtures, alloys, reaction products, and the like. "Inclusive" denotes the endpoints of a range. The terms "a", "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, when present, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

What is claimed is:

1. An electrochemical device, comprising:
   an anode comprising magnesium;
   a cathode; and a carboranyl magnesium electrolyte comprising a composition having a formula of:

$$Mg(C_iB_jH_{j+1})X, \quad \text{formula (I)}$$

$$Mg(C_iB_jH_{j+1})Y, \quad \text{formula (II)}$$

$$Mg(C_iB_jH_{j+1})_2, \quad \text{formula (III)}$$

$$Mg_2(C_2B_jH_j)X_2, \text{ or} \quad \text{formula (IV)}$$

a combination of at least two of the foregoing, wherein i is 1 or 2; j is an integer between 8 and 11 inclusive; X is a halide; and wherein Y is a non-halide monoanion.

2. The electrochemical device of claim 1, wherein $C_iB_jH_{j+1}$, representing a carboranyl anion of the carboranyl magnesium electrolyte, is an icosahedral closo-carboranyl anion in which (i+j) equals 12.

3. The electrochemical device of claim 1, wherein X is Cl⁻, or Br⁻, or I⁻.

4. The electrochemical device of claim 1 wherein Y is $(BH_4)^-$.

5. The electrochemical device of claim 1, wherein the carboranyl magnesium electrolyte is obtained by contacting a carborane having a formula $C_iB_jH_{i+j}$ with a Grignard reagent or dialkylmagnesium compound.

6. The electrochemical device of claim 1, wherein the carboranyl magnesium electrolyte is obtained by contacting a carboranyl lithium, represented by a formula $LiC_iB_jH_{j+1}$ or by the formula $Li_2C_2B_jH_j$, with a magnesium salt.

7. The electrochemical device of claim 1, wherein carboranyl magnesium electrolyte is obtained by contacting carboranyl silver, represented by a formula $AgC_iB_jH_{j+1}$, with a magnesium salt.

8. The electrochemical device of claim 1, wherein the electrolyte is stable at an electrical potential greater than 3.0 V.

9. A process for preparing an electrochemical device, comprising:

connecting an anode composed of magnesium or a magnesium alloy and a cathode via an external electrically conductive structure; and contacting the anode and cathode with a carboranyl magnesium electrolyte comprising a composition having a formula of:

$$Mg(C_iB_jH_{j+1})X, \quad \text{formula (I)}$$

$$Mg(C_iB_jH_{j+1})Y, \quad \text{formula (II)}$$

$$Mg(C_iB_jH_{j+1})_2, \quad \text{formula (III)}$$

$$Mg_2(C_2B_jH_j)X_2, \text{ or} \quad \text{formula (IV)}$$

a combination of at least two of the foregoing, wherein i is 1 or 2; j is an integer between 8 and 11 inclusive; X is a halide; and wherein Y is a non-halide monoanion.

10. The process of claim 9, wherein $C_iB_jH_{j+1}$, representing a carboranyl anion of the carboranyl magnesium electrolyte, is an icosahedral-closo-carboranyl anion in which (i+j) equals 12.

11. The process of claim 9, wherein X is Cl⁻, or Br⁻, or I⁻.

12. The process of claim 9, wherein Y is $(BH_4)^-$.

13. The process of claim 9, wherein the carboranyl magnesium electrolyte is obtained by contacting a carborane having a formula $C_iB_jH_{i+j}$ with a Grignard reagent or dialkylmagnesium compound.

14. The process of claim 9, wherein the carboranyl magnesium electrolyte is obtained by contacting a carboranyl lithium, represented by a formula $LiC_iB_jH_{j+1}$ or by a formula $Li_2C_2B_jH_j$, with a magnesium salt.

15. The process of claim 9, wherein the carboranyl magnesium electrolyte is obtained by contacting carboranyl silver, represented by a formula $AgC_iB_jH_{j+1}$, with a magnesium salt.

16. The process of claim 15, wherein the electrolyte is stable at an electrical potential greater than 3.0V.

* * * * *